(12) United States Patent
Beaufrere

(10) Patent No.: US 9,415,860 B2
(45) Date of Patent: *Aug. 16, 2016

(54) SYSTEM AND METHOD FOR CONFIGURING A DIRECT LIFT CONTROL SYSTEM OF A VEHICLE

(71) Applicant: The Boeing Company, Chicago, IL (US)

(72) Inventor: Henry L. Beaufrere, Mercer Island, WA (US)

(73) Assignee: The Boeing Company, Chicago, IL (US)

(*) Notice: Subject to any disclaimer, the term of this patent is extended or adjusted under 35 U.S.C. 154(b) by 43 days.

This patent is subject to a terminal disclaimer.

(21) Appl. No.: 14/495,620

(22) Filed: Sep. 24, 2014

(65) Prior Publication Data
US 2015/0012156 A1   Jan. 8, 2015

Related U.S. Application Data

(63) Continuation of application No. PCT/US2013/023391, filed on Jan. 28, 2013, and a continuation of application No. 13/457,499, filed on Apr. 27, 2012, now Pat. No. 8,712,606.

(51) Int. Cl.
| | |
|---|---|
| *B64C 13/16* | (2006.01) |
| *G05D 1/04* | (2006.01) |
| *B64C 13/50* | (2006.01) |
| *B64C 9/00* | (2006.01) |

(Continued)

(52) U.S. Cl.
CPC . *B64C 13/16* (2013.01); *B64C 9/00* (2013.01); *B64C 13/04* (2013.01); *B64C 13/503* (2013.01); *G05D 1/042* (2013.01); *G08G 5/02* (2013.01)

(58) Field of Classification Search
CPC ........ B64C 13/16; B64C 13/503; B64C 9/00; B64C 13/04; G05D 1/042; G08G 5/02
USPC ......................................................... 701/16
See application file for complete search history.

(56) References Cited

U.S. PATENT DOCUMENTS

| | | |
|---|---|---|
| 3,386,690 A | 6/1968 | Prilliman et al. |
| 3,399,849 A | 9/1968 | Hendrick |

(Continued)

FOREIGN PATENT DOCUMENTS

GB          1598005          9/1981

OTHER PUBLICATIONS

International Preliminary Report on Patentability and Written Opinion, issued by the International Searching Authority in connection with corresponding International patent application No. PCT/US2013/023391, mailed on Oct. 28, 2014, 6 pages.

(Continued)

*Primary Examiner* — Richard Camby
(74) *Attorney, Agent, or Firm* — Hanley, Flight & Zimmerman, LLC

(57) ABSTRACT

Systems and methods for configuring a direct lift control system of a vehicle are disclosed. An example system provided herein includes a spoiler coupled to an aircraft, a direct lift control schedule to generate a plurality of spoiler deflection commands and a controller to control an actuator coupled to the spoiler to actuate the spoiler based on the spoiler deflection commands to modulate lift of the aircraft without using a short-period pitch control.

26 Claims, 6 Drawing Sheets

(51) Int. Cl.
*B64C 13/04* (2006.01)
*G08G 5/02* (2006.01)

(56) References Cited

U.S. PATENT DOCUMENTS

| | | | |
|---|---|---|---|
| 3,589,648 A | 6/1971 | Gorham et al. | |
| 3,618,878 A | 11/1971 | Klein et al. | |
| 3,738,594 A | 6/1973 | Donovan et al. | |
| 3,743,221 A | 7/1973 | Lykken et al. | |
| 3,870,253 A | 3/1975 | Leidy et al. | |
| 4,261,537 A | 4/1981 | Frosch et al. | |
| 4,472,780 A | 9/1984 | Chenoweth | |
| 5,000,404 A | 3/1991 | Martorella | |
| 8,712,606 B2 * | 4/2014 | Beaufrere | G05D 1/042 244/75.1 |
| 2009/0138144 A1 | 5/2009 | Flannigan et al. | |
| 2009/0157239 A1 | 6/2009 | Walton et al. | |

OTHER PUBLICATIONS

Merat, Romain. "Study of a Direct Lift Control System Based on the A380 aircraft," 46th AIAA Aerospace Sciences Meeting and Exhibit, 2008, 11 pages.

Elliott, J.R., "NASA's Advanced Control Law Program for the F-8 Digital Fly-by-Wire Aircraft," Decision and Control including the 15th Symposium on Adaptive Processes, 1976 IEEE Conference, vol. 15, Dec. 1976, 5 pages.

Kohlman D. L. and Brainerd C. H., "Evaluation of Spoilers for Light Aircraft Flight Path Control", AIAA vol. 11, No. 8, Aug. 1974, 8 pages.

International Search Report, issued by the International Searching Authority in connection with corresponding International patent application No. PCT/US/2013/23391, mailed on Mar. 13, 2013, 4 pages.

Office Action, issued by the United States Patent and Trademark Office in connection with U.S. Appl. No. 13/457,499, on May 15, 2013, 17 pages.

Notice of Allowance and Fee(s) Due, issued by the United States Patent and Trademark Office in connection with U.S. Appl. No. 13/457,499, on Dec. 17, 2013, 11 pages.

Notification of the First Office Action and Search Report, issued by the State Intellectual Property Office of the P.R. China, in connection with Chinese Patent Application No. 2013800203349, on Apr. 6, 2016, 22 pages.

* cited by examiner

SYSTEM AND METHOD FOR CONFIGURING A DIRECT LIFT CONTROL SYSTEM OF A VEHICLE

RELATED APPLICATIONS

This patent arises from a continuation of International Application No. PCT/2013/023391, entitled "System and Method for Configuring a Direct Lift Control System of a Vehicle," filed Jan. 28, 2013, which is a continuation of U.S. patent application Ser. No. 13/457,499 (now U.S. Pat. No. 8,712,606), entitled "System and Method for Configuring a Direct Lift Control System of a Vehicle," filed Apr. 27, 2012. The disclosures of International Application No. PCT/2013/023391 and U.S. patent application Ser. No. 13/457,499 are incorporated herein by reference in their entireties.

FIELD

Embodiments of the present disclosure relate generally to controlling flow over fluid dynamic surfaces. More particularly, embodiments of the present disclosure relate to means for configuring a direct lift control system of a vehicle.

BACKGROUND

Modulating lift directly to control an aircraft's flight path rather than indirectly via modulating the aircraft's pitch attitude to alter angle of attack, and thereby lift, is known as Direct Lift Control (DLC). DLC flight control systems have been applied to both commercial and military aircraft to improve their approach and landing handling characteristics.

SUMMARY

A system and methods for configuring a direct lift control (DLC) system of a vehicle are presented. A plurality of fly-by-wire control surfaces is provided, and fly-by-wire control surface deflection commands of the fly-by-wire control surfaces are scheduled. The fly-by-wire control surfaces are symmetrically actuated based on the fly-by-wire control surface deflection commands such that a fluid dynamic lift of the vehicle is modulated without using a short-period pitch control.

In this manner, a simple, cost-effective alternate means of controlling an aircraft equipped with fly-by-wire wing-trailing-edge spoilers in an event of a jammed elevator is provided. Specifically the spoilers are commanded symmetrically to directly modulate the aircraft's aerodynamic lift, and thereby flight path, via a force transducer located on the aircraft control wheel column. The force transducer signal is shaped to ensure pilot command response characteristics that may be operated with substantially minimal or substantially no pilot training. The spoiler deflections are scheduled such that a change in the aerodynamic lift is substantially maximized while ensuring no adverse pitching moment and substantially minimizing tail buffet.

In an embodiment, a direct lift control system of a vehicle comprises a plurality of fly-by-wire control surfaces, a control surface direct lift control schedule, and an actuator. The control surface direct lift control schedule generates fly-by-wire control deflection commands. The actuator symmetrically actuates the fly-by-wire control surfaces based on the fly-by-wire control surface deflection commands such that a fluid dynamic lift of the vehicle is modulated without using a short-period pitch control.

In another embodiment, a method for configuring a direct lift control system of a vehicle provides a plurality of fly-by-wire control surfaces, and schedules fly-by-wire control surface deflection commands of the fly-by-wire control surfaces. The method further symmetrically actuates the fly-by-wire control surfaces based on the fly-by-wire control surface deflection commands such that a fluid dynamic lift of the vehicle is modulated without using a short-period pitch control.

In a further embodiment, a method of operating an aircraft comprising a direct lift control system activates the direct lift control system comprising fly-by-wire spoilers if an elevator is jammed. The method further performs an approach and a landing by symmetrically actuating the fly-by-wire spoilers based on fly-by-wire spoiler deflection commands such that an aerodynamic dynamic lift of the aircraft is modulated without using a short-period pitch control.

The direct lift control system of a vehicle may include a plurality of fly-by-wire control surfaces, a control surface direct lift control schedule operable to generate a plurality of fly-by-wire control deflection commands and an actuator operable to symmetrically actuate the fly-by-wire control surfaces based on the fly-by-wire control surface deflection commands such that a fluid dynamic lift of the vehicle is modulated without using a short-period pitch control. The fly-by-wire control surfaces may include fly-by-wire spoilers. The fly-by-wire control surface deflection commands may include fly-by-wire spoiler deflection commands, and the control surface direct lift control schedule can include a fly-by-wire spoiler direct lift control schedule. The fly-by-wire spoilers may be coupled to a wing of the aircraft, and a force transducer can be located on a control wheel column of the aircraft and operable to generate a force transducer signal in response to receiving a column force from the control wheel column. If a force transducer is used, the signal may be shaped to obtain a direct lift command to retain a substantially same pilot action applied via the column force to flare with the direct lift system that is applied with the short-period pitch control, thereby alleviating pilot training. The fly-by-wire control deflection commands can be generated based on the direct lift command. The fly-by-wire spoiler deflection commands can also be scheduled such that a change in aerodynamic lift of the aircraft is substantially maximized while ensuring no adverse pitching moment is generated and a tail buffet is substantially minimized.

Fly-by-wire spoilers can be operable to actuate such that the direct lift control system is configured in an event of a jammed elevator. The fly-by-wire spoilers may be actuated such that an approach and a landing are performed without the short-period pitch control.

The short-period pitch control may comprise at least one control surface selected from the group consisting of an elevator, a stabilator, a tailplane, and a trim tab.

The invention involves a method for configuring a direct lift control system of a vehicle that includes providing a plurality of fly-by-wire control surfaces, scheduling a plurality of fly-by-wire control surface deflection commands of the fly-by-wire control surfaces, and symmetrically actuating the fly-by-wire control surfaces based on the fly-by-wire control surface deflection commands such that a fluid dynamic lift of the vehicle is modulated without using a short-period pitch control. The fly-by-wire control surfaces may include a plurality of fly-by-wire spoilers, and the fly-by-wire control surface deflection commands comprising a plurality of fly-by-wire spoiler deflection commands. The fly-by-wire spoilers may be coupled to a wing of the aircraft.

The method may also include generating a force transducer signal from a force transducer located on a control wheel column of the aircraft in response to receiving a column force from the control wheel column and shaping the force transducer signal to provide a direct lift command to retain a substantially same pilot action applied via the column force to flare with the direct lift system that is applied with the short-period pitch control, thereby alleviating pilot training. In addition, it may include scheduling the fly-by-wire spoiler deflection commands such that a change in aerodynamic lift of the aircraft is substantially maximized while ensuring no adverse pitching moment is generated and a tail buffet is substantially minimized. The direct lift control system may be configured in an event of a jammed elevator by symmetrically actuating the fly-by-wire spoilers based on the fly-by-wire spoiler deflection commands. An approach may be performed and a landing by symmetrically actuating the fly-by-wire spoilers without using the short-period pitch control. The short-period pitch control may comprise at least one control surface selected from the group consisting of: an elevator, a stabilator, a tailplane, and a trim tab.

The method of operating an aircraft comprising a direct lift control system may include activating the direct lift control system comprising a plurality of fly-by-wire spoilers if an elevator is jammed and performing an approach and a landing by symmetrically actuating the fly-by-wire spoilers based on a plurality of fly-by-wire spoiler deflection commands such that an aerodynamic dynamic lift of the aircraft is modulated without using a short-period pitch control.

In addition, the fly-by-wire spoiler deflection commands may be established by generating a force transducer signal from a force transducer located on a control wheel column of the aircraft in response to receiving a column force from the control wheel column, shaping the force transducer signal to provide a direct lift command to retain a substantially same pilot action applied via the column force to flare with the direct lift control system that is applied with the short-period pitch control, thereby alleviating pilot training, providing a fly-by-wire spoiler direct lift control schedule based on the direct lift command, scheduling the fly-by-wire spoiler deflection commands based on the direct lift command such that a change in aerodynamic lift of the aircraft is substantially maximized while ensuring no adverse pitching moment is generated and a tail buffet is substantially minimized, and generating the fly-by-wire spoiler deflection commands.

Each of the elements of the invention can enhance its performance, operation, or efficiency.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to fly-by-wire systems, Direct Lift Control (DLC) techniques, fluid dynamics, structures, control surfaces, manufacturing, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, using spoilers on an aircraft wing to provide DLC. Embodiments of the disclosure, however, are not limited to such spoiler applications, and the techniques described herein may also be utilized in other fluid dynamic surface applications. For example, embodiments may be applicable to other lift surfaces of an aircraft such as a flap or a tail, a control surface of an aircraft such as an aileron, a hydrodynamic surface utilizing liquid (e.g., water) instead of air, and other application.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
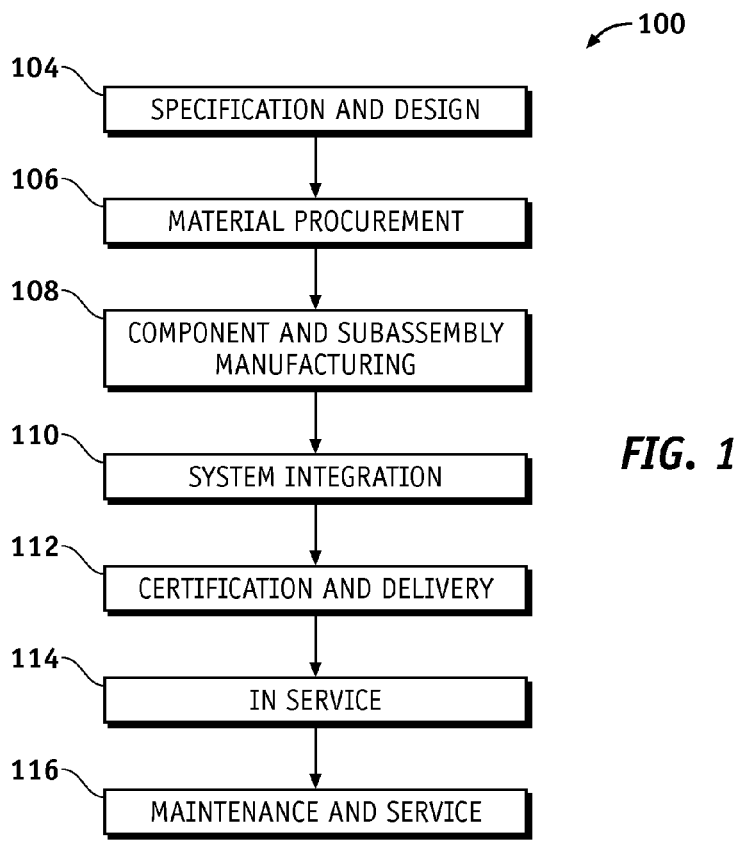
FIG. 1 is an illustration of a flow diagram of an exemplary aircraft production and service methodology.
Figure 2:
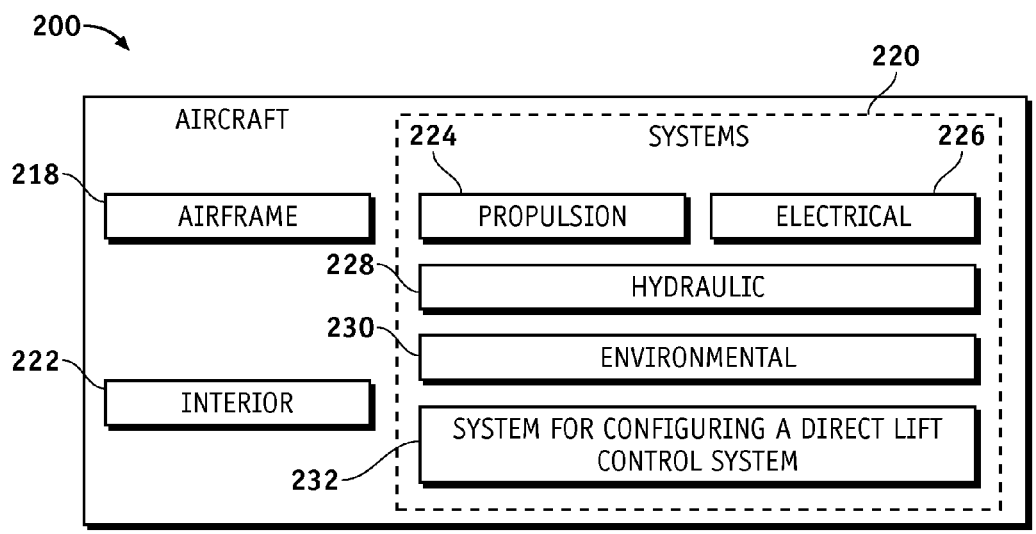
FIG. 2 is an illustration of an exemplary block diagram of an aircraft.

Referring more particularly to the drawings, embodiments of the disclosure may be described in the context of an aircraft manufacturing and service method 100 (method 100) as shown in FIG. 1 and an aircraft 200 as shown in FIG. 2.

During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, an environmental system 230, and a system for configuring a direct lift control system 232. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Government requirements may call for in part that an airplane must be shown to be capable of continued substantially optimally functional flight and landing after a jam in the elevator control position encountered during takeoff, climb, cruise, normal turns, descent, and landing without requiring exceptional piloting skill or strength unless the jam is shown to be extremely improbable.

Embodiments of the discloser provide a Direct Lift Control (DLC) system configured such that a pilot can perform both an approach and a landing task without any elevator and/or other means of controlling a short-period pitch controller (a short-period pitch control) such as an elevator. Embodiments of disclosure provide a simple, cost-effective alternate means of controlling an aircraft equipped with fly-by-wire wing-trailing-edge spoilers in an event of a jammed elevator. Spoilers are commanded symmetrically to directly modulate the aircraft's aerodynamic lift, and thereby flight path, via a force transducer located on the aircraft control wheel column, in lieu of deflecting the wheel column, as the jammed elevator prevents a mechanically connected wheel column from being deflected. The force transducer signal is shaped to ensure pilot command response characteristics that may be operated with substantially minimal or substantially no pilot training. The spoiler deflections are scheduled such that a change in aerodynamic lift is substantially maximized while ensuring no adverse pitching moment and substantially minimizing tail buffet.

Using the DLC system according to the embodiments provides an alternate means of controlling an aircraft in an event of a jammed elevator and avoids the costs associated with the other alternatives commonly used comprising stabilizer trim systems with sufficient responsiveness to allow the pilot adequate control of the aircraft and redundant elevator control systems.

Figure 3:
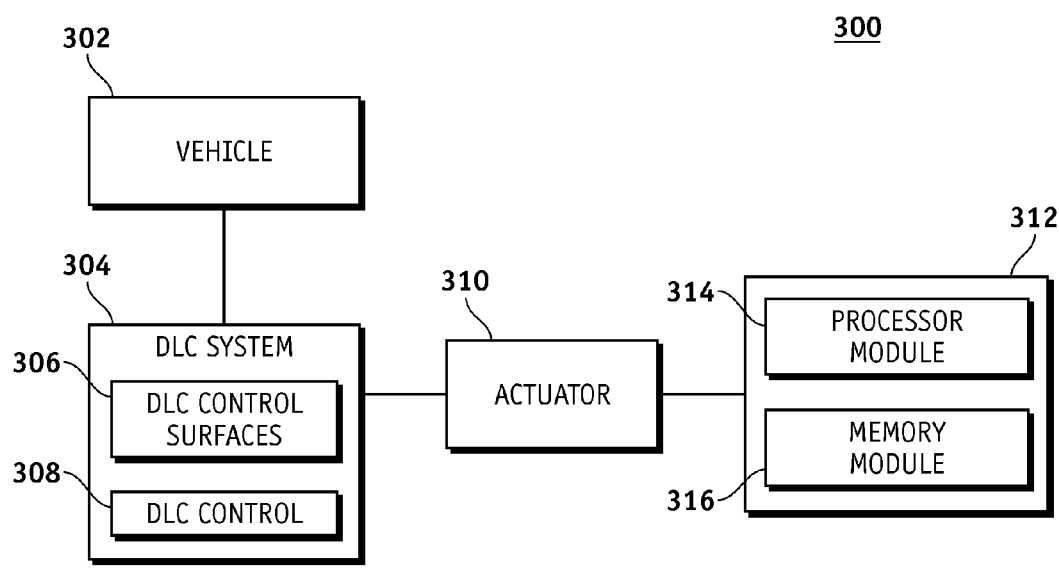
FIG. 3 is an illustration of an exemplary aircraft control system comprising a DLC system according to an embodiment of the disclosure.

FIG. 3 is an illustration of an exemplary functional block diagram of a control system 300 (system 300) comprising a DLC system 304 according to an embodiment of the disclosure. The system 300 may comprise a vehicle 302, the DLC system 304, an actuator 310, and a controller 312.

The vehicle 302 may comprise, for example but without limitation: an aircraft comprising lift surfaces such as a flap or a tail, control surfaces such as ailerons, elevators, and spoilers; a hydrodynamic surface utilizing liquid (e.g., water) instead of air; or other vehicle capable of generating fluid-dynamic lift.

The DLC system 304 comprises a DLC control surface 306 (control surfaces 306), and a DLC control 308. The DLC control surfaces 306 may comprise for example but without limitation, flaperons, slats, symmetric spoilers, symmetric ailerons, or other DLC control surface. The DLC control 308, may comprise for example but without limitation, a control yoke (also known as a control column or a control wheel column), center stick or side-stick (the latter two also colloquially known as a control or joystick) governs the vehicle 302 roll and pitch by moving the ailerons when turned or deflected left and right, and moves the elevators when moved backwards or forwards, rudder pedals to control yaw which move the rudder, or other means of control.

The actuator 310 is operable to vary a position (e.g., bend, deflect, extend, change shape) of the DLC control surface 306 in response to an actuation command. A fly-by-wire (FBW) system may be used to replace manual flight control of the vehicle 302 with an electronic interface. Movements of DLC control 308 are converted to electronic signals transmitted by wires (hence the fly-by-wire term), and flight control computers such as the controller 312 determine how to move the actuator 310 at each DLC control surface 306 to provide an expected response. The actuation command may be generated by an input from the DLC control 308 via a pilot/operator, a preprogrammed input to the DLC control 308 from a processor module 314 of the controller 312 in case of automated control, or a combination thereof.

In one embodiment, the actuator 310 is controlled via a control mechanism by the controller 312 to control a position of the DLC control surface 306 based on a spoiler Direct Lift Control schedule 416 as explained in more detail below in the context of discussion of FIG. 4. In this manner, the DLC control surface 306 moves/rotates/extends/deflects to provide an alternate means of controlling the vehicle 302 in an event of a jammed elevator.

Any actuator known to those skilled in the art may be used for actuation of the DLC control surface 306. For example but without limitation, a hydraulic actuator, a piezoelectric actuator, a spring loaded mechanism, a reverse flow blocking mechanism, a pyrotechnic actuator, a shape memory alloy actuator, or other actuator may be used.

The controller 312 may comprise, for example but without limitation, a processor module 314, a memory module 316, and other module. The controller 312 may be implemented as, for example but without limitation, a part of an aircraft system, a centralized aircraft processor, a subsystem computing module devoted to the DLC system 304, or other implementation.

The controller 312, may be located remotely from the actuator 310, or may be coupled to the actuator 310. The controller 312 is configured to control the actuator 310 to vary a position of the DLC control surface 306 according to a DLC schedule and/or various operation conditions. The operation conditions may comprise, for example but without limitation, flight conditions, or other condition. The flight conditions may comprise, for example but without limitation, take off, cruise, approach, landing, or other flight condition. Thus, the operation conditions may comprise for example but without limitation, an altitude, an airspeed, a Mach number, a temperature, or other parameter.

In one embodiment, the controller 312 determines how to move the actuator 310 at each DLC control surface 306 to provide the expected response based on the DLC schedule such as a spoiler DLC schedule 416 as explained in more detail below in the context of discussion of FIG. 4.

The processor module 314 comprises processing logic that is configured to carry out the functions, techniques, and processing tasks associated with the operation of the system 300. In particular, the processing logic is configured to support the system 300 described herein. For example, the processor module 314 may direct the actuator 310 to vary a position of the DLC control surface 306 based on a DLC schedule and/or various flight conditions. The processor module 314 may direct the actuator 310 to move at least one DLC control surface 306 in response to an input from the DLC control 308 via a pilot/operator or a preprogrammed input from the processor module 314. In one embodiment, the processor module 314 determines how to move the actuator 310 at each DLC control surface 306 to provide an expected response based on the DLC schedule.

The processor module 314 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 316 may comprise a data storage area with memory formatted to support the operation of the system 300. The memory module 316 is configured to store, maintain, and provide data as needed to support the functionality of the system 300. For example, the memory module 316 may store a DLC schedule, a DLC command, a deflection command, flight configuration data, a shaping function, a column force, a DLC schedule table, or other data.

In some embodiments, the memory module 316 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 316 may be coupled to the processor module 314 and be configured to store, for example but without limitation, a database, a computer program that is executed by the processor module 314, an operating system, an application program, tentative data used in executing a program, or other application. Additionally, the memory module 316 may represent a dynamically updating database containing a table for updating the database, and the like.

The memory module 316 may be coupled to the processor module 314 such that the processor module 314 can read information from and write information to the memory module 316. For example, the processor module 314 may access the memory module 316 to access the DLC command, the deflection command, the shaping function, the column force, the DLC schedule table, an aircraft speed, a flight control surface position, an angle of attack, a Mach number, an altitude, or other data.

As an example, the processor module 314 and memory module 316 may reside in respective application specific integrated circuits (ASICs). The memory module 316 may also be integrated into the processor module 314. In an embodiment, the memory module 316 may comprise a cache memory for storing temporary variables or other intermediate information during execution of instructions to be executed by the processor module 314.

Figure 4:
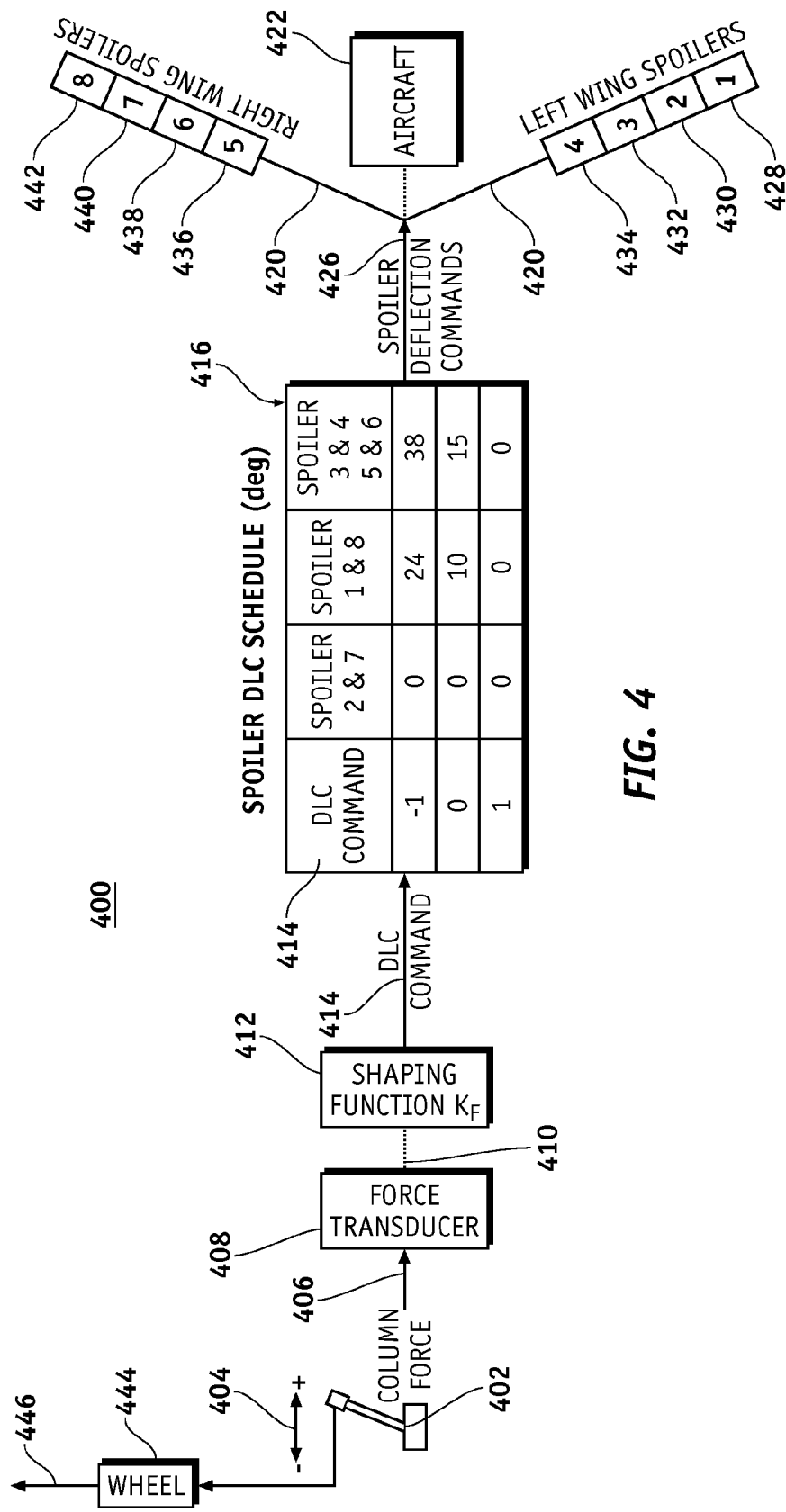
FIG. 4 is an illustration of the DLC system shown in FIG. 3 in more detail.

FIG. 4 is an illustration of a DLC system 400 showing details of the DLC system 304 shown in FIG. 3. The DLC system 400 may comprise, a control wheel column 402 (308 in FIG. 3), a force transducer 408, a column force signal shaping function 412, a spoiler DLC schedule 416, a plurality of fly-by-wire spoilers 428, 430, 432, 434, 436, 438, 440, and 442 (1-8) used as the DLC control surfaces 306 (FIG. 3) coupled to a wing 420 of an aircraft 422 (302 in FIG. 3). In this document spoilers and control surfaces may be used interchangeably.

In operation, in an event of a jammed elevator the DLC system 400 may be engaged via a cockpit switch or automatically via a command from the processor module 314. Movements 404 of the control wheel column 402 are converted to electronic signals transmitted by wires and the controller 312 determines how to move the actuator 310 (FIG. 3) at each fly-by-wire spoilers 428-442 (1-8) to provide symmetric spoiler deflection commands 426 (expected response) based on a DLC command 414 input to the spoiler DLC schedule 416. The spoiler deflection commands 426 are generated by the spoiler DLC schedule 416. Symmetric spoiler deflection commands, fly-by-wire spoiler deflection commands, spoiler deflection commands, and symmetric fly-by-wire spoiler deflection commands, may be used interchangeably in this document. Similarly, symmetric control surface deflection commands, fly-by-wire control surface deflection commands, control surface deflection commands, and symmetric fly-by-wire control surface deflection commands, may be used interchangeably in this document.

The fly-by-wire spoilers 428-442 (1-8) are commanded symmetrically to directly modulate an aerodynamic lift of the wing of the aircraft 422, and thereby flight path, via the force transducer 408 located on the control wheel column 402 of the aircraft 422. The force transducer 408 receives a column force 406 from the control wheel column 402 and generates a force transducer signal 410 in response to receiving a column force 406. The force transducer signal 410 is shaped by a column force signal shaping function 412 (KF 412) to provide the DLC command 414. The DLC command 414 (direct lift command 414) retains substantially a same pilot action applied via the column force 406 to flare the aircraft with the DLC system 400 that is applied with a short-period pitch control. Thereby alleviating pilot training.

Where $K_F$ 412 is based on a $$K_F = \frac{1}{\text{Max column flare force}}$$

A substantially Max column flare force maximum column flare force is normally used to flare a transport category aircraft with a nose-up pitch attitude command to the elevator and is typically designed to be around 20 to 30 lbs. Thus this same force may be used to scale/shape the DLC system 400 to retain substantially a same pilot action. Scaling the substantially maximum authority of the DLC system 400 in this manner prevents the pilot from over flaring the aircraft.

In contrast to embodiments of the disclosure, over flaring an aircraft may result in a non-optimal flight condition. Over controlling may be a natural tendency of pilots used to seeing an aircraft nose rise in response to their flare control input and thus may need training to resist this tendency.

The actuator 310 symmetrically actuates the fly-by-wire spoilers 428-442 (1-8) based on the fly-by-wire spoiler deflection commands 426 (fly-by-wire spoiler actuation commands) such that an aerodynamic lift of the wing 420 of the aircraft 422 is modulated without using any short-period pitch control such as an elevator. Fly-by-wire spoiler deflection commands 426, spoiler deflection commands 426, and symmetric spoiler deflection commands 426 may be used interchangeably in this document.

The spoiler deflection commands 426 may be scheduled by the spoiler DLC schedule 416 based on a DLC command 414 such that a change in aerodynamic lift of the wing 420 of the aircraft 422 is substantially maximized while ensuring no adverse pitching moment and substantially minimizing tail buffet.

In the embodiment shown in FIG. 4, the spoiler DLC schedule 416 generates the spoiler deflection commands 426 in degrees of deflection/extension for each of the fly-by-wire spoilers 428-442 (1-8) in response to the DLC command 414 commanding lift.

When the DLC system 400 is engaged the DLC command 414 is set to 0 to bias the fly-by-wire spoilers 428-442 (1-8) to a neutral deflection. As shown in the embodiment of FIG. 4 spoilers 430 and 440 (symmetric spoiler pairs 2 and 7) remain retracted at zero deflection, fly-by-wire spoilers 428 and 442 (symmetric spoiler pairs 1 and 8) extend to 10 degrees each, and the fly-by-wire spoilers 432-438 (symmetric spoiler pairs 3 and 6, and 4 and 5) extend to 15 degrees. The pilot can then trim any pitching moment due to the neutral spoiler deflections with a stabilizer.

The DLC command 414 may command a decrease in the commanded aerodynamic lift by changing from 0 to −1. The DLC command 414 of −1 indicates a substantially maximum decrease in the commanded aerodynamic lift (0 to −1).

If the DLC command 414 is −1 then spoilers 430 and 440 (symmetric spoiler pairs 2 and 7) do not deflect, fly-by-wire spoilers 428 and 442 (symmetric spoiler pairs 1 and 8) extend to 24 degrees each, and the fly-by-wire spoilers 432-438 (symmetric spoiler pairs 3 and 6, and 4 and 5) extend to 38 degrees each.

The DLC command 414 may command an increase in the commanded aerodynamic lift by changing from 0 to 1. The DLC command 414 of 1 indicates a substantially maximum increase in the commanded aerodynamic lift (0 to 1).

If the DLC command 414 is 1 then all of the fly-by-wire spoilers 428-442 (1-8) retract to zero degrees.

The symmetric spoiler deflection commands 426 may be summed with asymmetric spoiler deflection commands 446 from a wheel 444 of control wheel column 402 to retain a roll control capability of the wheel-commanded differential spoiler deflections in a presence of the DLC command 414.

The DLC system 400 provides, a simple, cost-effective alternate means of controlling the aircraft 422 equipped with fly-by-wire wing-trailing-edge spoilers such as the fly-by-wire spoilers 428-442 in an event of a jammed elevator. The DLC system 400 avoids the costs associated with the existing systems commonly used. The existing systems comprise stabilizer trim systems with sufficient responsiveness to allow the pilot adequate control of an aircraft and redundant pitch attitude control systems. Unlike the existing systems, the DLC system 400 provides a DLC system configured such that a pilot can perform both the approach and the landing task without any elevator and/or other means of controlling the short-period pitch.

Figure 5:
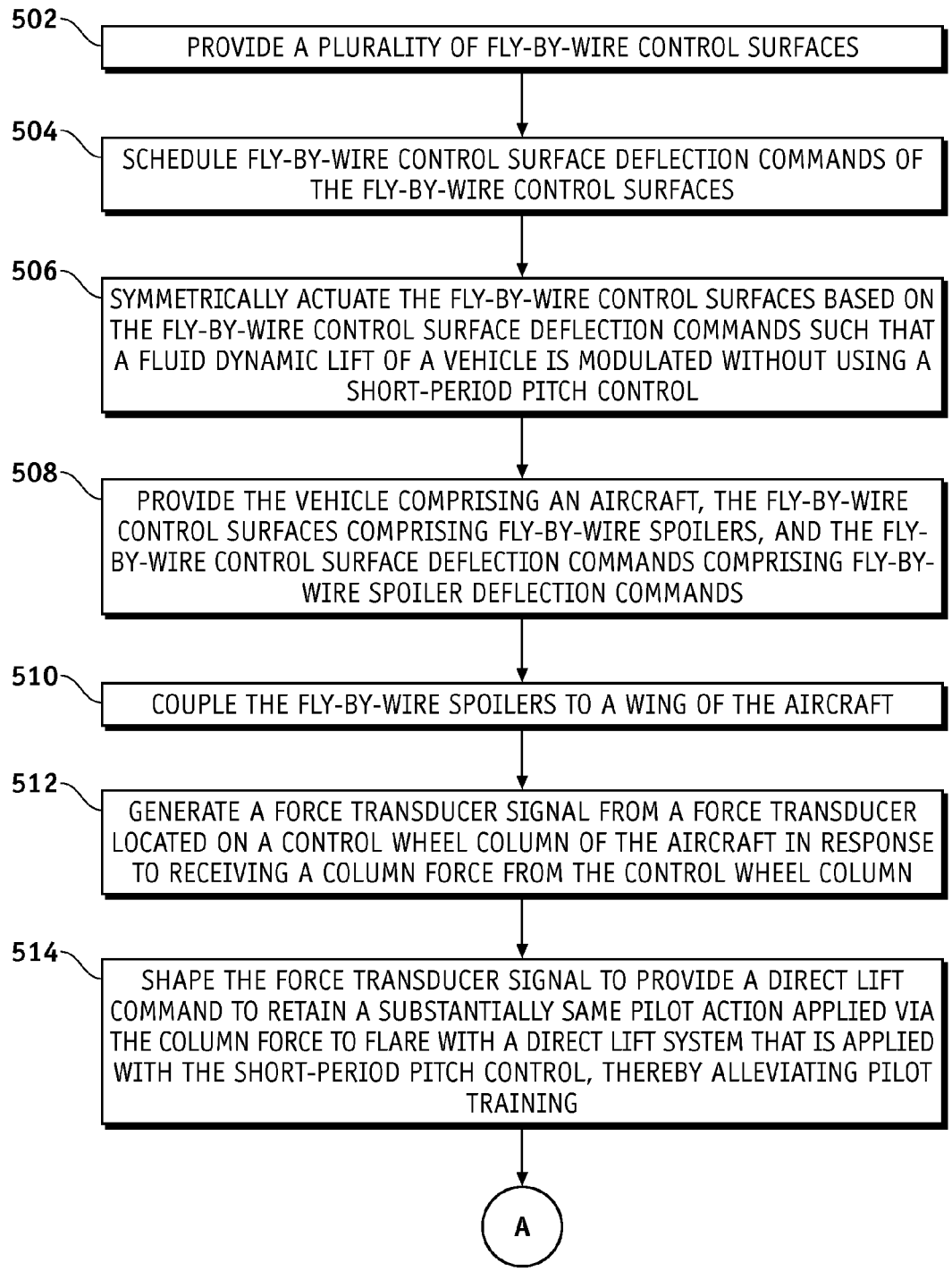
FIG. 5 is an illustration of an exemplary flowchart showing a DLC configuration process according to an embodiment of the disclosure.
Figure 5:
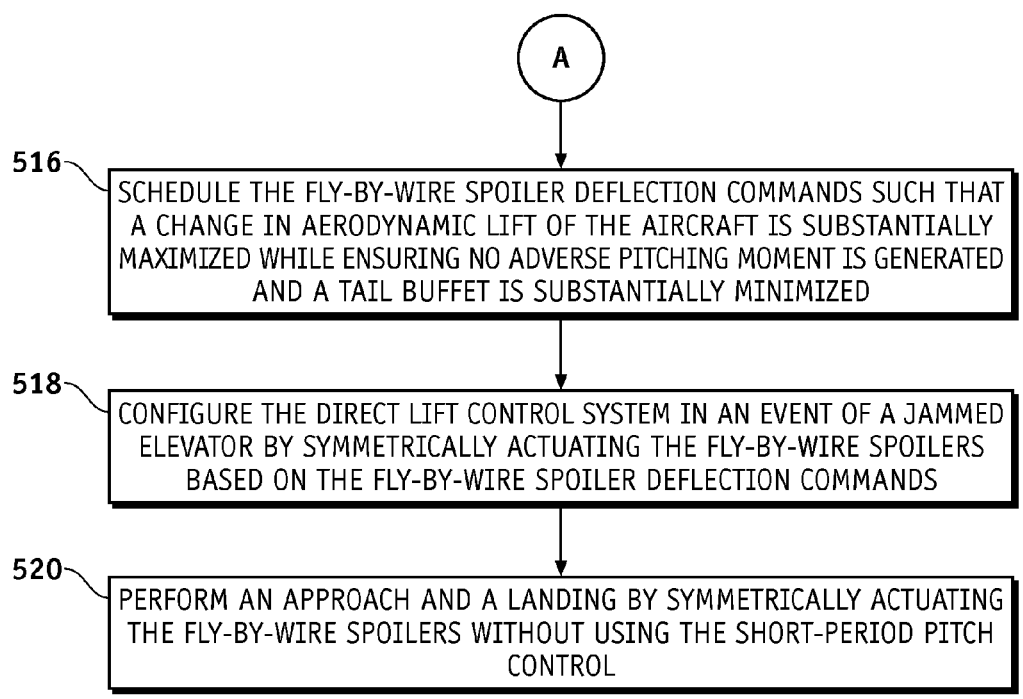

FIG. 5 is an illustration of an exemplary flowchart showing a DLC configuration process 500 according to an embodiment of the disclosure. The various tasks performed in connection with process 500 may be performed mechanically, by software, hardware, firmware, computer-readable software, computer readable storage medium, or any combination thereof. It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein.

For illustrative purposes, the following description of process 500 may refer to elements mentioned above in connection with FIG. 1-4. In practical embodiments, portions of the process 500 may be performed by different elements of the system 300 and the DLC system 400 such as: the vehicle 302, the DLC system 304, the actuator 310, the controller 312, the control wheel column 402, the force transducer 408, the column force signal shaping function 412, the spoiler DLC schedule 416, the fly-by-wire spoilers 428-442, etc. It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein.

Process 500 may begin by providing a plurality of fly-by-wire control surfaces such as the DLC control surfaces 306 (task 502).

Process 500 may continue by scheduling fly-by-wire control surface deflection commands of the fly-by-wire control surfaces (task 504).

Process 500 may continue by symmetrically actuating the fly-by-wire control surfaces based on the fly-by-wire control surface deflection commands such that a fluid dynamic lift of a vehicle such as the vehicle 302 is modulated without using a short-period pitch control (task 506). The short-period pitch control may comprise, for example but without limitation, an elevator, a stabilator, a tailplane, a trim tab, or other means.

Process 500 may continue by providing the vehicle 302 comprising an aircraft such as the aircraft 422, the fly-by-wire control surfaces comprising fly-by-wire spoilers such as the fly-by-wire spoilers 428-442 (1-8), and the fly-by-wire control surface deflection commands comprising fly-by-wire spoiler deflection commands such as the fly-by-wire spoiler deflection commands 426 (task 508).

Process 500 may continue by coupling the fly-by-wire spoilers 428-442 (1-8), to a wing such as the wing 420 of the aircraft 422 (task 510).

Process 500 may continue by generating a force transducer signal such as the force transducer signal 410 from a force transducer such as the force transducer 408 located on a control wheel column such as the control wheel column 402 of the aircraft 422 in response to receiving a column force such as the column force 406 from the control wheel column 402 (task 512).

Process 500 may continue by shaping the force transducer signal 410 to provide a direct lift command such as the direct lift control command 414 to retain a same pilot action applied via the column force 406 to flare with a direct lift system such as the DLC system 304/400 that is applied with the short-period pitch control, thereby alleviating pilot training (task 514).

Process 500 may continue by scheduling the fly-by-wire spoiler deflection commands 426 such that a change in aerodynamic lift of the aircraft 422 is substantially maximized while ensuring no adverse pitching moment is generated and a tail buffet is substantially minimized (task 516).

Process 500 may continue by configuring the direct lift control system 304/400 in an event of a jammed elevator by symmetrically actuating the fly-by-wire spoilers 428-442 (1-8) based on the fly-by-wire spoiler deflection commands 426 (task 518).

Process 500 may continue by performing an approach and a landing by symmetrically actuating the fly-by-wire spoilers 428-442 (1-8) without using the short-period pitch control (task 520).

Figure 6:
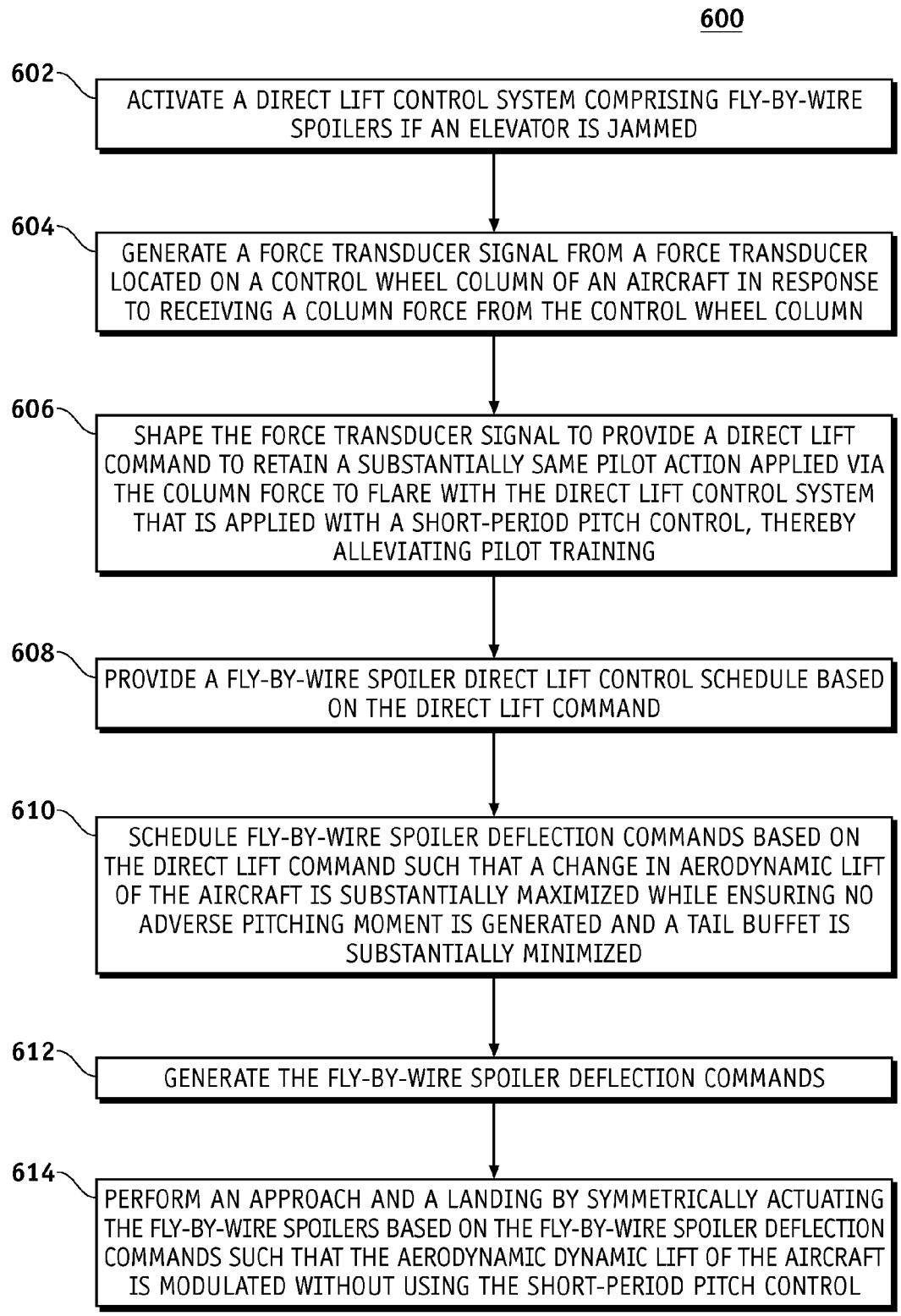
FIG. 6 is an illustration of an exemplary flowchart showing a process for operating a vehicle control system comprising a DLC system according to an embodiment of the disclosure.

FIG. 6 is an illustration of an exemplary flowchart showing a process 600 for operating a vehicle control system comprising a DLC system according to an embodiment of the disclosure. The various tasks performed in connection with process 600 may be performed mechanically, by software, hardware, firmware, computer-readable software, computer readable storage medium, or any combination thereof. It should be appreciated that process 600 may include any number of additional or alternative tasks, the tasks shown in FIG. 6 need not be performed in the illustrated order, and the process 600 may be incorporated into a more comprehensive procedure or process having additional functionality not described in detail herein.

For illustrative purposes, the following description of process 600 may refer to elements mentioned above in connection with FIGS. 1-4. In practical embodiments, portions of the process 600 may be performed by different elements of the system 300 and the DLC system 400 such as: the vehicle 302, the DLC system 304, the actuator 310, the controller 312, the control wheel column 402, the force transducer 408, the column force signal shaping function 412, the spoiler DLC schedule 416, the fly-by-wire spoilers 428-442, etc. It should be appreciated that process 600 may include any number of additional or alternative tasks, the tasks shown in FIG. 6 need not be performed in the illustrated order, and the process 600 may be incorporated into a more comprehensive procedure or process having additional functionality not described in detail herein.

Process 600 may begin by activating a direct lift control system such as the direct lift control system 304/400 comprising fly-by-wire spoilers such as the fly-by-wire spoilers 428-442 (1-8) if an elevator is jammed (task 602).

Process 600 may continue by generating a force transducer signal such as the force transducer signal 410 from a force transducer such as the force transducer 408 located on a control wheel column such as the control wheel column 402 of an aircraft such as the aircraft 422 in response to receiving a column force such as the column force 406 from the control wheel column 402 (task 604).

Process 600 may continue by shaping the force transducer signal 410 to provide a direct lift command such as the direct lift control command 414 to retain a substantially same pilot action applied via the column force 406 to flare with the direct lift control system that is applied with a short-period pitch control, thereby alleviating pilot training (task 606).

Process 600 may continue by providing a fly-by-wire spoiler direct lift control schedule such as the fly-by-wire spoiler direct lift control schedule 416 based on the direct lift control command 414 (task 608).

Process 600 may continue by scheduling fly-by-wire spoiler deflection commands such as the fly-by-wire spoiler deflection commands 426 based on the direct lift control command 414 such that a change in aerodynamic lift of the aircraft is substantially maximized while ensuring no adverse pitching moment is generated and a tail buffet is substantially minimized (task 610).

Process 600 may continue by generating the fly-by-wire spoiler deflection commands 426 (task 612).

Process 600 may continue by performing an approach and a landing by symmetrically actuating the fly-by-wire spoilers 428-442 (1-8) based on the fly-by-wire spoiler deflection commands 426 such that the aerodynamic lift of the aircraft 422 is modulated without using the short-period pitch control (task 614).

In this way, embodiments of disclosure provide a simple, cost-effective alternate means of controlling an aircraft equipped with fly-by-wire wing-trailing-edge spoilers in an event of a jammed elevator. Unlike the existing solutions, embodiments of the discloser provide a DLC system configured such that a pilot can perform both the approach and the landing task without any elevator and/or other means of controlling the short-period pitch.

While example embodiments have been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-6 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 314 to cause the processor module 314 to perform specified operations. Such instructions, generally referred to as "computer program code" or "program code" (which may be grouped in the form of computer programs or other groupings), when executed, enable the system 300 and the DLC system 400.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated.

What is claimed is:

1. A system comprising:
   a spoiler coupled to an aircraft;
   a direct lift control schedule to generate a plurality of spoiler deflection commands; and
   a controller to control an actuator coupled to the spoiler to actuate the spoiler based on the spoiler deflection commands to modulate lift of the aircraft without using a short-period pitch control.

2. The system of claim 1 further comprising a plurality of spoilers coupled to the aircraft, wherein the spoiler deflection commands are to direct each of the spoilers to deflect to modulate the lift of the aircraft.

3. The system of claim 1 further comprising a transducer to generate a signal in response to a column force from a control wheel column of the aircraft.

4. The system of claim 3, wherein the signal is shaped based on the column force to produce a direct lift command to flare the aircraft, the column force being substantially equal to a force applied with the short-period pitch control to flare the aircraft.

5. The system of claim 4, wherein the spoiler deflection commands are based on the direct lift command.

6. The system of claim 4, wherein the spoiler deflection commands are scheduled to maximize the lift of the aircraft without generating a pitching moment.

7. The system of claim 1, wherein the controller is to control the actuator to actuate the spoiler when an elevator of the aircraft is jammed.

8. The system of claim 1, wherein the controller is to control the actuator to actuate the spoiler to perform a landing without the short-period pitch control.

9. The system of claim 1, wherein the short-period pitch control comprises at least one of an elevator, a stabilator, a tailplane or a trim tab of the aircraft.

10. The system of claim 1, wherein the spoiler deflection commands are based on preprogrammed degrees of deflection of the spoiler.

11. The system of claim 1, wherein the controller is to control the actuator to actuate the spoiler further based on at least one of an altitude, an airspeed, a mach number or a temperature.

12. A method comprising:
    scheduling a plurality of direct lift control spoiler deflection commands for a plurality of spoilers coupled to an aircraft;
    actuating the spoilers based on the direct lift control spoiler deflection commands to modulate lift of the aircraft; and
    controlling a flight path of the aircraft with the spoilers without using a short-period pitch control.

13. The method of claim 12, wherein the spoilers are actuated symmetrically.

14. The method of claim 12, wherein the flight path is a landing flight path.

15. The method of claim 12 further comprising:
    generating, via a transducer, a signal in response to a column force from a control wheel column of the aircraft; and
    shaping the signal to produce a direct lift command to flare the aircraft based on the column force, the column force being substantially equal to a force applied to the control wheel column with the short-period pitch control to flare the aircraft.

16. The method of claim 12 further comprising scheduling the direct lift control spoiler deflection commands to maximize the lift of the aircraft without generating a pitching moment.

17. The method of claim 12 further comprising symmetrically actuating the spoilers based on the direct lift control spoiler deflection commands when an elevator of the aircraft is jammed.

18. The method of claim 12 further comprising performing an approach and a landing by symmetrically actuating the spoilers without using the short-period pitch control.

19. The method of claim 12, wherein the short-period pitch control comprises at least one of an elevator, a stabilator, a tailplane or a trim tab of the aircraft.

20. The method of claim 12, wherein the direct lift control spoiler deflection commands are based on preprogrammed degrees of deflection of the spoilers.

21. A method comprising:
    activating a direct lift control system of an aircraft when an elevator of the aircraft is jammed, the direct lift control system comprising a plurality of control surfaces coupled to the aircraft; and performing an approach or a landing by symmetrically actuating the control surfaces based on a plurality of control surface deflection commands to modulate lift of the aircraft without using a short-period pitch control.

22. The method of claim 21, wherein the direct lift control system is activated automatically when the elevator is jammed.

23. The method of claim 21, wherein the control surfaces comprise at least one of flaperons, slats, symmetric spoilers or symmetric ailerons.

24. The method of claim 23 further comprising generating the control surface deflection commands based on preprogrammed degrees of deflection of the symmetric spoilers.

25. The method of claim 21 further comprising controlling a flight path of the aircraft with the direct lift control system.

26. The method of claim 21, wherein the short-period pitch control comprises at least one of an elevator, a stabilator, a tailplane or a trim tab of the aircraft.

* * * * *